United States Patent [19]
Wente

[11] Patent Number: 5,381,625
[45] Date of Patent: Jan. 17, 1995

[54] FLOWERING PLANTER

[76] Inventor: Robert H. Wente, 2378 Barrington Woods Rd., Palatine, Ill. 60074

[21] Appl. No.: 222,879

[22] Filed: Apr. 5, 1994

[51] Int. Cl.$^6$ .............................................. A01G 9/02
[52] U.S. Cl. ...................................... 47/83; 47/82
[58] Field of Search ...................................... 47/82, 83

[56] References Cited

U.S. PATENT DOCUMENTS

| 297,932 | 4/1884 | Groves et al. | 47/82 |
|---|---|---|---|
| 2,152,869 | 4/1939 | Campbell | 47/82 |
| 3,685,204 | 8/1972 | O'Harra | 47/83 |
| 4,143,487 | 3/1979 | Hollwarth . | |
| 4,404,767 | 9/1983 | Enrich | 47/83 |
| 4,986,027 | 1/1991 | Harvey | 47/82 |
| 5,031,359 | 7/1991 | Moffett, Jr. | 47/83 |
| 5,046,282 | 9/1991 | Whitaker . | |
| 5,081,790 | 1/1992 | Hinton . | |

FOREIGN PATENT DOCUMENTS

| 2525869 | 12/1977 | Germany | 47/83 |
|---|---|---|---|
| 231444 | 3/1944 | Switzerland | 47/83 |
| 2147484 | 5/1985 | United Kingdom . | |

Primary Examiner—Ramon S. Britts
Assistant Examiner—Joanne C. Downs
Attorney, Agent, or Firm—Charles F. Meroni, Jr.

[57] ABSTRACT

A flowering planter comprising an axially elongated upright cylindrically shaped hollow sleeve. The sleeve is comprised of an opaque synthetic plastic material. A cup shaped bottom is disposed at a bottom end of the sleeve. Adhesive secures the axially elongated upright cylindrically shaped hollow sleeve in water tight assembly with the cup shaped bottom, a hanger structure connects the hanger structure to an upper open end of the sleeve for hanging the planter to an above ground support. Vertically extending circumferentially spaced keyhole shaped slots are oriented on the axially elongated upright cylindrically shaped hollow sleeve for plants to extend through the vertically extending circumferentially spaced keyhole shaped slots. A cylindrically shaped watering tube is mounted internally of the axially elongated upright cylindrically shaped hollow sleeve in coaxial relation therewith. Tube holder structures positioned internally of the elongated upright cylindrically shaped hollow sleeve and is engaged with a closed lower end of the cylindrically shaped watering tube assisting in holding the cylindrically shaped watering tube in an upright position in radially spaced relation to an interior surface of the axially elongated upright cylindrically shaped hollow sleeve. The cylindrically shaped watering tube has axially spaced water discharge orifices circumferentially positioned in radially confronting relation and axially above the circumferentially spaced keyhole shaped slots enabling water to be conveyed through the orifices to plant root structure positioned in radial adjacency to each of the circumferentially spaced keyhole shaped slots.

6 Claims, 2 Drawing Sheets

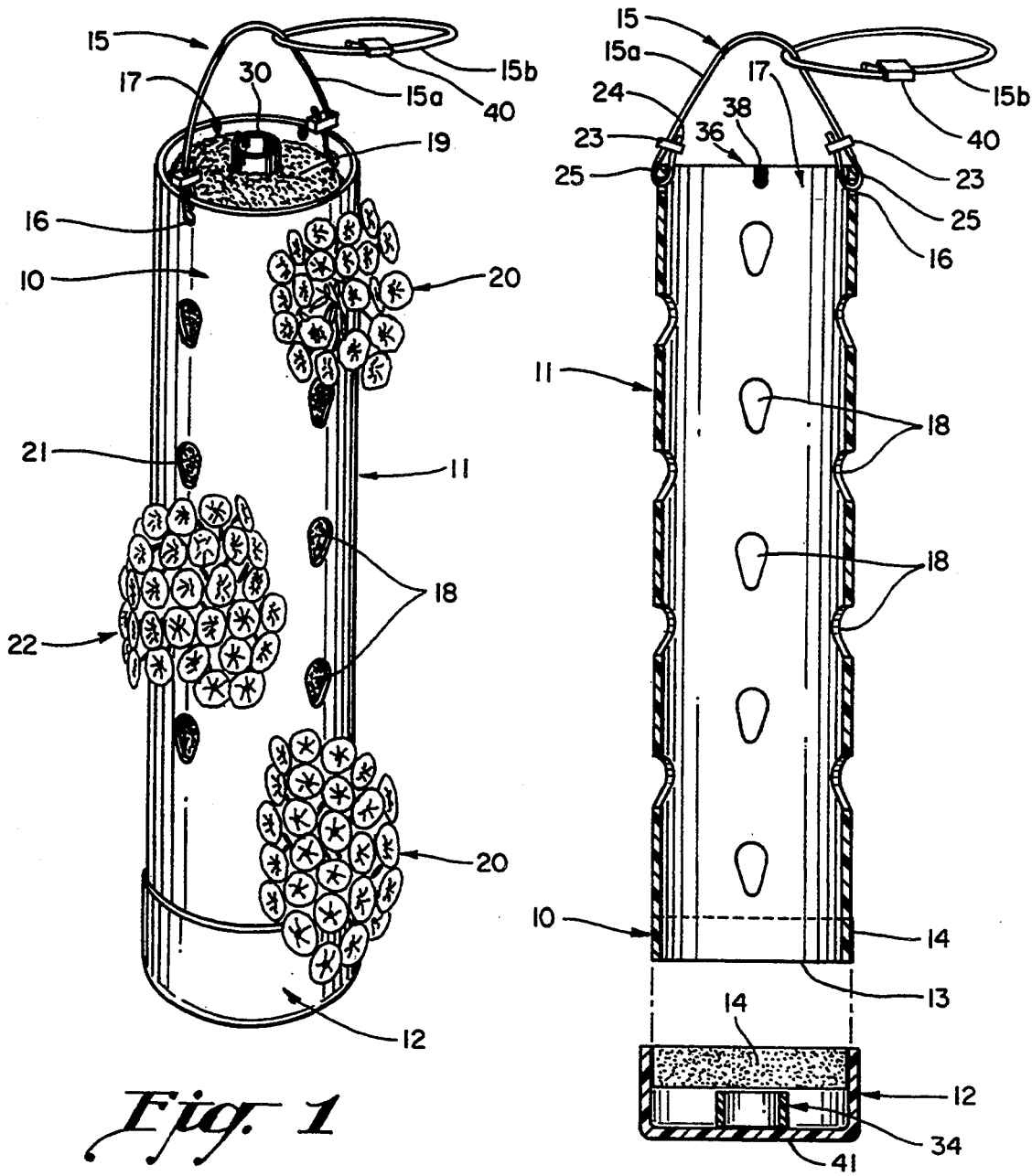
Fig. 1
Fig. 2
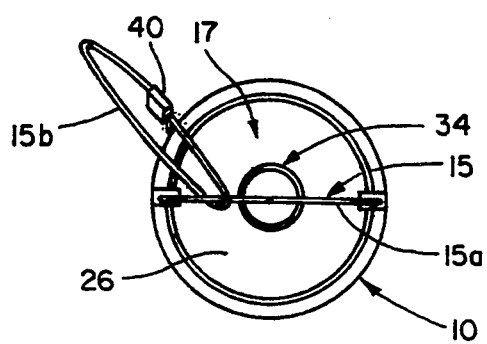
Fig. 3
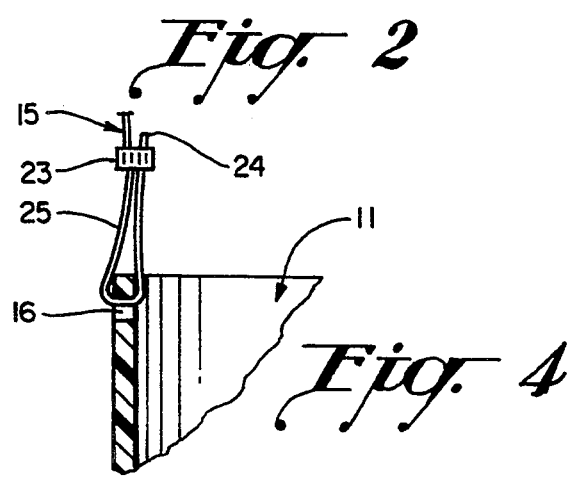
Fig. 4

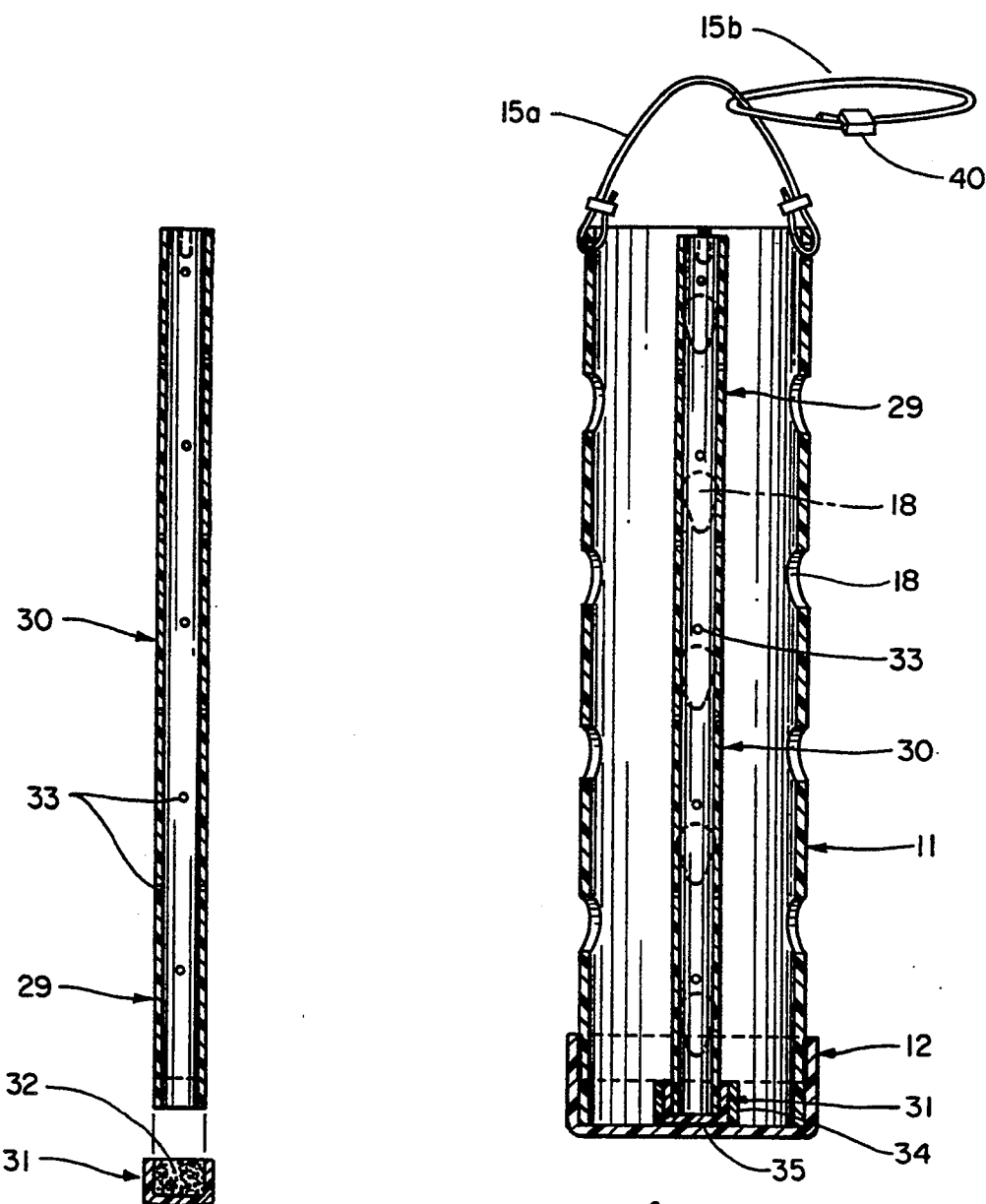
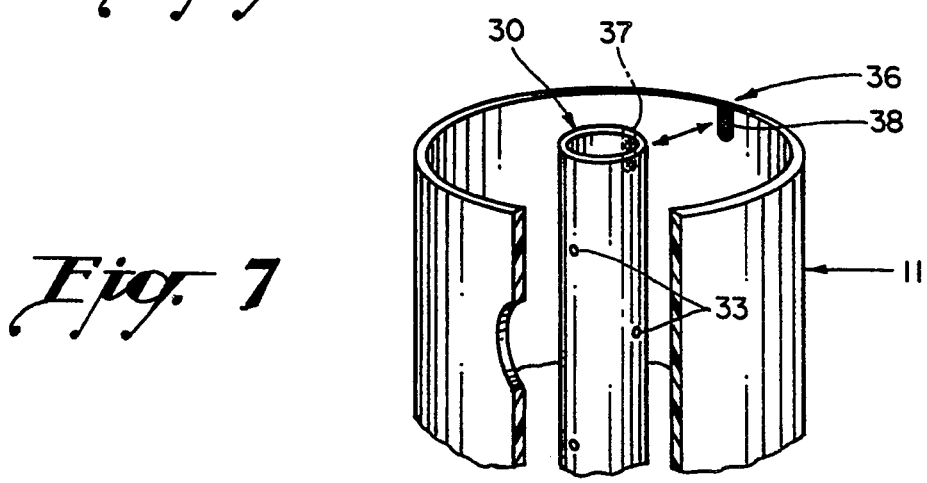
Fig. 5
Fig. 6
Fig. 7

FLOWERING PLANTER

BACKGROUND OF THE INVENTION

1. Field of the Invention

A flowering tube or planter which is herein disclosed is one that is particularly adapted to receive earthen soil. The flowering planter is provided with vertically spaced keyhole slots which are arranged in circumferentially spaced rows about an outer diameter of an elongated upright sleeve. Flowering plants protrude through the keyhole slots with roots embedded in soil carried inside of the planter. In accordance with important features of my invention, the flowering planter is provided with an inner watering tube that is coaxially mounted with the flowering tube or planter and is supported internally of the planter so as to be equidistantly spaced from the vertically spaced keyhole slots in the outer shell or tube. This watering tube is further provided with circumferentially and axially spaced orifices preferably positioned slightly above the keyhole slots for enabling water poured into an upper end of the watering tube to be conveyed and discharged through the orifices to the root structure of flowering plants that extend through the keyhole slots. Flowering plants such as impatiens and begonias can then be inserted through the slots into earthen soil provided in the flowering tube or sleeve for providing the soil requirements to sustain the life of the plants when the plants are planted in the soil and watered through an upper open end of the elongated upright sleeve.

My planter when filled with flowery plants provides a very attractive addition to a person's patio or garden area and is also usable by shut-ins where a back yard garden may be unavailable such as for condominium dwellers and the like. This planter is also constructed so that it can be economically manufactured on a production basis, if desired.

2. Description of the Prior Art

In connection with the searches made of the prior art, attention is drawn to the following listed U.S. Pat. Nos.:
4,143,487
5,046,282
5,081,790
GB 2, 147,484 A Based on a review of the above listed patents, it is not believed that any of them are particularly pertinent to my flowering planter. None of these patents provide a closed ended water tight watering tube co-axially mounted in an outer sleeve that can be readily used for propagating plants. U.S. Pat. No. 4,583,322 shows a patent entitled "Ornamental Container and Display Assembly for a Seedling Plant". In this instance, the plant is grown out through an open upper end of the container as indicated at 18. The container is provided with a slotted ring member which also enable Christmas tree boughs to be extended through holes 49 in the container as seen in FIGS. 8 and 9. It is an important object of my invention to provide a flowering planter where flowering plants can be grown from slots in the tube where the tube contains earthen soil, with water being inserted through an open end of the watering tube for the purpose of providing moisture through tube orifices to the flowering plants. The root structure of the plants extends through keyhole slots in the tube into the earthen soil with the water tube orifices being located just above and radially inwardly of the keyhole slots.

Other of the prior art patents show different types of watering tubes, but none of them are adapted to function in the unique manner that has been herein disclosed where a lower closed water tight end of the watering tube is co-axially aligned in removable assembly in an outer cylindrical keyhole slotted sleeve or planter and which embody important features of my invention. It is significant to note that my watering tube has a closed end at its bottom, thus confining the water that is poured into the tube so that it can only escape in a radial direction at axially and circumferentially spaced positions located in radial adjacency to keyhole slots provided in the outer tube or shell of my planter.

SUMMARY OF THE INVENTION

According to important features of my invention, I have provided a flowering planter comprising an axially elongated upright cylindrically shaped hollow sleeve, the sleeve being comprised of an opaque synthetic plastic material. A cup shaped bottom is disposed at a bottom end of the sleeve. Adhesive means secures the axially elongated upright cylindrically shaped hollow sleeve in water tight assembly with the cup shaped bottom. Attachment means connects a hanger structure to an upper open end of the sleeve for hanging the planter to an above ground support. Vertically extending circumferentially spaced keyhole shaped slots are provided in the axially elongated upright cylindrically shaped hollow sleeve for plants to extend through the vertically extending circumferentially spaced keyhole shaped slots. A cylindrically shaped watering tube is mounted internally of the axially elongated upright cylindrically shaped hollow sleeve in coaxial relation therewith. Water tube holding means is positioned internally of the elongated upright cylindrically shaped hollow sleeve engaged with a closed lower end of the cylindrically shaped watering tube assisting in holding the cylindrically shaped watering tube in an upright position in radially spaced relation to an interior surface of the axially elongated upright cylindrically shaped hollow sleeve. The cylindrically shaped watering tube has axially spaced water discharge orifices circumferentially positioned in radially confronting relation and axially above the circumferentially spaced keyhole shaped slots enabling water to be conveyed through the orifices to plant root structure positioned in radial adjacency to each of the circumferentially spaced keyhole shaped slots.

Yet other features of my flowering planter relate to the cup shaped bottom wherein the cup shaped bottom has a flat bottom surface enabling the flowering planter to be free standing when mounted on a level surface.

Still further features of my flowering planter relate to it being provided with a hanger structure which comprises a pair of superimposed loops. A lower most of the superimposed loops is physically attached at spaced intervals to the elongated upright cylindrically shaped hollow sleeve. An upper most of the loops is extended through the lower most loop and being positionable when disposed in one attitude in right angular relation, the hanger structure and the engaged superimposed loops serving as means to permit the flowering planter to turn for a fuller viewing of flowering areas carried on the flowering planter.

BRIEF DESCRIPTION OF THE DRAWINGS

FIG. 1 is a perspective view of my flowering planter with a spectacular array of flowers and color extending from the planter;

FIG. 2 is a vertical section through the planter shown in FIG. 1 only with a hanger structure for the planter being shown in elevation;

FIG. 3 is a top plan view of the planter shown in FIG. 2;

FIG. 4 is an enlarged fragmentary partially sectioned view showing the manner in which the hanger is secured to the tubular sleeve of my planter;

FIG. 5 is a vertical section of my watering tube adapted for assembly inside of my flowering planter as shown in FIG. 1;

FIG. 6 is a vertical section similar to FIG. 2 except with the parts shown in assembled relation rather than in an exploded illustration; and FIG. 7 is an enlarged fragmentary perspective view of a top edge area of my flowering planter showing a tell-tale device for aligning water tube orifices with keyhole slots in an outer sleeve of my flowering planter in accordance with other features of my invention.

DESCRIPTION OF THE PREFERRED EMBODIMENT

The reference number 10 indicates generally my flowering tube or my flower tube planter and this tube or planter embodies important features of my invention. The tube or planter comprises an elongated upright sleeve 11. The sleeve 11 is comprises preferably of an opaque synthetic plastic material. One material that has been found that is suitable for manufacture of my sleeve comprises an opaque polyvinyl chloride type tubing that is an "off-the-shelf" product that can be purchased in a variety of different retail construction supply outlets. The opaque character of the synthetic plastic material serves to conceal the contents of the sleeve 11 in accordance with other features of my invention so that any contents of the planter can be hidden particularly if the contents are unsightly, such as where earthen soil fills the sleeve 11. A cup shaped sleeve bottom 12 is disposed at a bottom end of the tube. This bottom end is indicated at 13. A water resistant adhesive 14 of any suitable type is applied to an upper end of an inside wall of the cup shaped bottom 12 as well as on external surface of the sleeve at the bottom end 13 of the sleeve permanently and fixedly securing these components together.

A hanger structure 15 is provided for mounting or suspending the planter 10 from a wall of a home or a garage or a patio fence, as desired. The hanger can be comprised of any suitable material such as reinforced synthetic type cord or wire and the like. The hanger structure 15 includes a lower hanger 15a. Sleeve hanger holes 16, 16 are provided in adjacent to an upper open end 17 of the sleeve 11. The hanger holes assist in the securement of opposite ends of the hanger 15a to the planter 10 as will be further described at a later point in this writing.

In accordance with other features of my invention, the opaque synthetic plastic elongated upright tubular sleeve 11 is provided with vertically extending circumferentially spaced slots 18 of any suitable shape. Excellent results are attainable where the slots are of a keyhole shape. These slots provide access points for enabling plants to be grown and extended through the slots 18.

Earthen soil 19 is placed into the sleeve 11 to essentially fill the sleeve and the cup shaped bottom 12 serves to assist in holding the earthen soil 19 within the sleeve 11 so that the earthen soil cannot spill out of the bottom of an open end of the sleeve.

A series of flowering plants of any suitable type such as begonias or impatiens are extended through the vertically extending circumferentially spaced keyhole slots 18. These flowering plants 20 are provided with roots (not shown) that are embedded in the earthen soil 19 anchoring the flowering plants 20 to the planter 10. The plants have foliage and flowers which radiate circumferentially about the sleeve (see FIGS. 1 and 2) providing the planter with a spectacular array 22 (FIG. 1) of flowers and color.

In order to further assist in mounting of the hanger 15a to the sleeve 11, I have provided retainer ferrules 23,23. Hanger ends 24,24 are turned into hanger loops 25,25. These loops extend through the retainer ferrules as shown in FIGS. 2, 3, and 4. The hanger end 24 projects upwardly above the ferrule and the ferrule serves to pinch each loop 25 and the hanger end 24 to hold the hanger in fastened relationship to the upper end of the sleeve 11. It will be appreciated that other types of fasteners might be used to secure the hanger to the sleeve 11, but excellent results are attainable by using a ferrule in the manner illustrated in the drawings.

In accordance with my invention I have provided a watering tube structure 29 which includes a synthetic plastic watering tube 30 and a closed cup-shaped end 31 in which the watering tube 30 is telescoped and adhesively secured. A water resistant adhesive 32 is preferably used. This closed cup-shaped end 31 has a flat bottom surface for engagement with an upwardly facing interior surface of the cup-shaped bottom 12. The synthetic plastic watering tube 30 is at all times located in removably mounted relation with the ring 34. This ring 34 does serve to maintain the watering tube 30 in an upright position when it is mounted in the socket defined by the ring 34. Where it is desired to remove the watering tube 30 after a growing season has ended and an owner might wish to remove the contents of the flowering planter, the tube 30 can then be withdrawn by moving it axially outwardly of an open end of the sleeve 11. The soil in the sleeve can then be dumped. The sleeve 11 can then be cleaned, whereupon the watering tube 30 can be replaced with the bottom end of the watering tube engaged in the socket provided by the ring 34. At that point, fresh soil 19 can be put into the flowering planter in readiness for use during the next flowering season. As another option, the user can also empty the soil and other contents of the sleeve and replace the planter with styrofoam or other suitable filler material, whereupon artificial flowers or vines can have ends inserted through the keyhole slots into the styrofoam in supported assembly with the flowering planter. In order to enable the watering tube to water at vertically spaced intervals in the general areas of the location of the keyhole shaped slots 18, watering orifices 33 are circumferentially and axially spaced along the length of the watering tube 30. The orifices are so positioned that when the watering tube 30 is snugly engaged in the bottom of the closed cup-shaped end 31, the orifices are centered and slightly positioned above a corresponding related keyhole shaped slot 18 so that the orifices can discharge water into the outer sleeve at positions above the slots. The water is gravity fed to the plants 20 that are rooted in the soil 19 through the keyhole slots 18 when the planter is hung from a post by its hanger structure 15.

In order to hold the watering tube in proper position internally of the outer sleeve 11, I have provided a watering tube attachment ring 34 that is adhesively secured by a water resistant adhesive at 35 to an interior upwardly facing surface of the cup-shaped member 12.

To further assist in proper alignment of the orifices 33 with the keyhole slots 18, I have provided a tell-tale indicator 36 for visual alignment by the person using my planter. This indicator includes tell-tale radially alignable painted spots 37 and 38 which are provided on an outside surface of the watering tube 30 and on an inside surface of the sleeve 11. When the spots are radially aligned with the watering tube 30 fully engaged in secured positioned within the watering tube attachment ring 34, then the orifices 33 will be in proper radial and axial alignment with respect to one another at which point the orifices are in axially spaced relation above the keyhole slots 18. The orifices 33 are then also radially spaced inwardly of the associated keyhole slots 18, thus enabling water to be transmitted from the filled watering tube 30 through the orifices 33 to the roots of the plants 20.

As another feature of my invention, I have provided a hanger loop 15b which is engaged with the hanger 15a as a part of the hanger structure 15. This hanger loop 15b has a hanger loop clasp or retainer 40 which secures opposite ends of the loop 15b in secured link-liked attachment to the hanger strap 15a. Thus, when the hanger 15b is connected to a plant hanger hook, the flowering planter will then be suspended in axial relation beneath the hook. If the flowering planter is at an outside location exposed to wind, then there is some tendency for the flowering planter to twist and spin, thus allowing for a fuller viewing of the exterior of my flowering planter from a given viewing point. By providing the additional closed ended loop 15b connected to the loop 15a, then the turning action can be enhanced for still greater rotative movement of the planter when blown by the wind.

I have further found that excellent results can be attained by providing the flowering planter 10 with a flat bottom as indicated at 41. This flat bottom 41 enables the planter to be set down onto a flat surface so that the flowering planter can be self supporting on its base and can be then serviced so that dead leaves can be picked from the planter or the water tube 30 and the planter can be filled. After a growing season, the soil and the plants can be removed along with the watering tube to permit the planter and the watering tube to be cleaned. A cover can be provided at a top end of the watering tube 30 to prevent soil from entering into the tube and possibly clogging the water discharge orifices 33.

The adhesive that I have used to secure various component parts of my flowering planter, such as is indicated at 14, 32, and 35 can be of any suitable type. I have found, however, that excellent results are attainable where I first use a cleaner on both surfaces that are to be secured. Such cleaners are well known in the prior art and can be purchased over the counter from suitable retail outlets. As I indicated, one type of cleaner that can be used which is specifically designed for CPVC-PVC-ABS on plastic pipe and fittings is put out by Oatey of 4700 W. 160th Street, Cleveland, Ohio 44135.

After the cleaner has been applied, I then use another product of Oatey which is called a regular clear cement for PVC. This cement then is applied to both surfaces that are to be secured after the cleaner has dried. By using these materials, I can provide water tight connections at those places where I have indicated that adhesive is required as previously mentioned herein.

While the preferred form of the invention has been specifically illustrated and described herein, it will be apparent to those skilled in the art that modifications and improvements may be made to the form herein specifically disclosed. Accordingly, the present invention is not to be limited to the form herein specifically disclosed or in any other way inconsistent with the progress in the art promoted by this invention.

I claim:

1. A flowering planter comprising an axially elongated upright cylindrically shaped hollow sleeve, the sleeve being comprised of an opaque synthetic plastic material, a cup shaped bottom disposed at a bottom end of the sleeve, adhesive means securing the axially elongated upright cylindrically shaped hollow sleeve in water tight assembly with said cup shaped bottom, a hanger structure, attachment means connecting the hanger structure to an upper open end of said axially elongated upright cylindrically shaped hollow sleeve for hanging the planter to an above ground support, vertically extending circumferentially spaced keyhole shaped slots in said axially elongated upright cylindrically shaped hollow sleeve for plants to extend through the vertically extending circumferentially spaced keyhole shaped slots, a cylindrically shaped watering tube mounted internally of said axially elongated upright cylindrically shaped hollow sleeve in coaxial relation therewith, the watering tube having an upper open end for receiving water and a lower closed end, means positioned internally of said axially elongated upright cylindrically shaped hollow sleeve engaged with a closed lower end of said cylindrically shaped watering tube holding said cylindrically shaped watering tube in an upright position in uniformly radially spaced relation along its length to an interior surface of said axially elongated upright cylindrically shaped hollow sleeve, said cylindrically shaped watering tube having axially spaced water discharge orifices circumferentially positioned in radially confronting relation and axially above said vertically extending circumferentially spaced keyhole shaped slots enabling water to be conveyed from the watering tube through the orifices to plant root structure positioned in radial adjacency to each of said circumferentially spaced keyhole shaped slots.

2. The flowering planter of claim 1, wherein the cup shaped bottom has a flat bottom surface enabling the flowering planter to be free standing when mounted on a level surface.

3. The flowering planter of claim 1, wherein the hanger structure comprises a pair of superimposed loops, a lower most of the superimposed loops being physically attached at spaced intervals to said axially elongated upright cylindrically shaped hollow sleeve, an upper most of the loops being extended through said lower most loop and being positionable when disposed in one attitude in right angular relation, the hanger structure and the engaged superimposed loops serving as means to permit the flowering planter to turn for a fuller viewing of flowering areas carried on the flowering planter.

4. The flowering planter of claim 1, wherein said means positioned internally of said axially elongated upright cylindrically shaped hollow sleeve comprises an annular ring, said ring being adhesively secured in fixed relation to an interior surface of said cup shaped bottom of said sleeve, said watering tube being removably mounted inside said ring for supporting the tube, the watering tube being manually removable from the said ring.

5. A flowering planter comprising an axially elongated upright cylindrically shaped hollow sleeve having a closed bottom end, a hanger structure attachment means connecting the hanger structure to an upper open end of said axially elongated upright cylindrically shaped hollow sleeve for hanging the planter to an above ground support, vertically extending circumferentially spaced keyhole shaped slots in said axially elongated upright cylindrically shaped hollow sleeve for plants to extend through the vertically extending circumferentially spaced keyhole shaped slots, a cylindrically shaped watering tube mounted on said closed bottom end internally and co-axially of said axially elongated upright cylindrically shaped hollow sleeve leaving an annular space radially outwardly of said cylindrically shaped watering tube for receipt of plant bedding material, the watering tube having an upper open end for receiving water and a lower closed tube end, means positioned internally of said axially elongated upright cylindrically shaped hollow sleeve engaged with the closed lower tube end of said cylindrically shaped watering tube holding said cylindrically shaped watering tube in an upright position in uniformly radially spaced relation along its length to an interior surface of said axially elongated upright cylindrically shaped hollow sleeve, said cylindrically shaped watering tube having axially spaced water discharge orifices circumferentially positioned in radially confronting relation and axially above said vertically extending circumferentially spaced keyhole shaped slots enabling water to be conveyed from the watering tube through the orifices to plant root structure positioned in radial adjacency to each of said vertically extending circumferentially spaced keyhole shaped slots.

6. The flowering planter of claim 5, wherein tell tale means is provided for radially aligning the orifices and the key hole slots.

* * * * *